UNITED STATES PATENT OFFICE.

WALTER P. SCHUCK, OF PORTLAND, OREGON.

PRODUCTION OF NICKEL CATALYZER.

1,305,173.        Specification of Letters Patent.        Patented May 27, 1919.

No Drawing.        Application filed January 9, 1918.    Serial No. 210,986.

*To all whom it may concern:*

Be it known that I, WALTER P. SCHUCK, a citizen of the United States, residing at Portland, in the county of Multnomah and State of Oregon, have invented certain new and useful Improvements in the Production of Nickel Catalyzer, of which the following is a specification.

The present invention relates to a method of producing a nickel catalyzer suitable for use in hydrogenation processes, particularly the hydrogenation or hardening of fatty oils, and consists in the novel steps hereinafter described.

In the production of the catalyzer, I mix together a solution of a nitrate and a reducing agent, preferably nitrate of nickel and cane sugar. The solutions should be mixed in such proportions as to produce a solution containing in each cubic centimeter .187 gram of metallic nickel (in the form of nickel nitrate) and .2686 gram of sucrose (cane sugar). These proportions should be rather closely followed in practice, since it has been found that considerable variation from these proportions does not produce a product having the properties hereinafter described. This solution is then introduced into a muffle already heated to a red heat, in which a substantially non-oxidizing atmosphere is maintained. For this purpose I find that an atmosphere of nitrogen and carbon dioxid gives good results, and this atmosphere can be maintained by allowing carbon dioxid to escape from a pipe at the closed end of the muffle, which drives out the free oxygen, and in the heating operation a considerable quantity of free nitrogen is liberated, which mixes with the carbon dioxid introduced.

The temperature of the muffle should be maintained preferably at about 550–650° C., or what is ordinarily called a cherry red heat. The product of the heating operation is cooled in a non-oxidizing atmosphere to ordinary temperature, and possesses the advantage over ordinary nickel catalyzer, that it can be left exposed to air for several days, without losing its catalytic activity.

The product of the incinerating operation is found to consist of a black flaky powder, containing no hard particles or cake. This powder requires no reduction either with hydrogen or other reducing gases, either before introducing into the oil, or in the oil before use. It obviously should not be exposed to the air until it has cooled, since at a red heat the free carbon therein would take fire.

Without restricting myself to the particular details of preparing the solution of nickel nitrate and sugar, I find that a convenient way of making this solution is to first prepare a solution of nickel nitrate of a specific gravity of about 1.6, and to add to this solution sugar in the proportion of 18 parts, to every 25 parts of metallic nickel contained in the solution. This solution is then diluted by adding 1 cc. of water to every 5 cc. of solution, and then adding 1 gram of sugar to every 7.5 cc. of solution remaining.

The nickel content of the catalyzer is found to be almost entirely in the metallic condition, and the catalyzer acts as a very efficient catalyst in the reduction of unsaturated fatty oils, at as low a temperature as 150° C., under atmospheric pressure. With metallic nickel catalyzers prepared by the prior processes with which I am familiar, if a temperature as low as 150° C. is to be employed, it is necessary to use a considerable superatmospheric pressure, to produce efficient hydrogenation of the oil.

In the incinerating operation, the solution is introduced into the muffle, while the muffle is at a cherry red heat. The solution of course quickly dries and is decomposed by the heat, and the product should be left in the muffle until it has attained substantially the temperature of the muffle. The product thus produced is a light porous mass, substantially homogeneous in appearance, and does not cake. A temperature considerably higher than 650° C. should not be employed, since at such temperatures a cake is produced in which form the product is less active.

What I claim is:

1. A process of making a catalyst suitable for use in hydrogenation processes which comprises heating an intimate mixture comprising a nitrate of a catalytic metal and a carbohydrate to a red heat, in an unoxidizing atmosphere, said two materials being so proportioned as to directly produce an uncaked intimate mixture containing free catalytic metal and free carbon, and cooling such product in a non-oxidizing atmosphere.

2. A process of making a catalyst consisting essentially of nickel and carbon, both existing in the product in the free state, said process comprising introducing into a muffle at a red heat in which a non-oxidizing atmosphere consisting largely of $CO_2$ and $N$ is maintained, a solution containing nickel nitrate and sugar in the proportions of about .187 gram of nickel and .2686 gram of sugar to each cubic centimeter, whereby a non-caked catalyzer material containing free carbon and free nickel is obtained, and then cooling such product under non-oxidizing conditions.

In testimony whereof I affix my signature.

WALTER P. SCHUCK.